(12) United States Patent
Fawcett, Jr. et al.

(10) Patent No.: US 7,618,577 B2
(45) Date of Patent: Nov. 17, 2009

(54) TWO-SHOT INJECTION MOLDING APPARATUS AND METHOD

(75) Inventors: Lyman W. Fawcett, Jr., St. Petersburg, FL (US); Gregory Jordan, Palm Harbor, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 401 days.

(21) Appl. No.: 11/435,112

(22) Filed: May 16, 2006

(65) Prior Publication Data

US 2007/0269636 A1 Nov. 22, 2007

(51) Int. Cl.
*B29C 45/14* (2006.01)
*B28B 7/00* (2006.01)

(52) U.S. Cl. ............... 264/328.8; 264/255; 264/294; 249/145; 425/112; 425/126.1; 425/577; 425/468

(58) Field of Classification Search ............. 264/241, 264/250, 255, 294, 328.8, 334; 249/144, 249/145; 425/112, 126.1, 468, 577
See application file for complete search history.

(56) References Cited

U.S. PATENT DOCUMENTS 3,947,176 A * 3/1976 Rainville ............ 425/130
2004/0101587 A1* 5/2004 Nix et al. ............ 425/468

* cited by examiner

*Primary Examiner*—Joseph S. Del Sole
*Assistant Examiner*—Timothy Kennedy
(74) *Attorney, Agent, or Firm*—Gray Robinson, P.A.

(57) ABSTRACT

An injection molding manufacturing apparatus and method that facilitates the formation of a blind hole in a two-component assembly in which a first component is molded in-situ in a second component. A first cylindrically-shaped component having a transverse socket with a blind hole is injected molding and then transferred into and molded in-situ within the second component in such a way that the blind hole is blocked-off by a second central core pin during molding of the second component. In this manner, the two-component in-situ assembly includes a blind hole formed in a socket.

7 Claims, 4 Drawing Sheets

TWO-SHOT INJECTION MOLDING APPARATUS AND METHOD

BACKGROUND OF THE INVENTION

1. Field of the Invention

This invention relates to injection molding manufacturing methods in which one component is molded in-situ within a subsequently injected molded component.

2. Description of the Background Art

Presently, there exists many techniques for injection molding. Conventional molding of a multi-component product includes a first step of injection molding a first component and then manually transferring the first component into another mold in which is then injection molded the second component so as to encompass the first component and achieve an in-situ molded assembly. More contemporary injection molding techniques eliminate the need for manually transferring the first component from the first-component mold into the mold of the second component. Rather, the process occurs in what is commonly referred to as a two-shot injection molding process that does not require any manual transferring of the molded in-situ first component.

Whether by manual transfer or by employing two-shot molding, it is often difficult to create blind holes in the components while maintaining tight tolerances. Specifically, when injection molding components that require tight tolerances, it is often necessary to keep the central core pin that defines the interior dimensions of the component cool during the injection mold process. Typically, the central core pin is cooled by flowing a fluid through the central core pin. The need for cooling the central core pin to achieve the tight tolerances during the injection molding process, precludes the use of transverse core pins that could otherwise be used to form blind holes in the component being injection molded. Hence, there presently exists a need for a two-component manufacturing apparatus and method that allows the use of a fluid-cooled central core pin to achieve appropriate tolerances while allowing the formation of a blind hole.

Therefore, it is an object of this invention to provide an improvement which overcomes the aforementioned inadequacies of the prior art methods and devices and provides an improvement which is a significant contribution to the advancement of the injection molding manufacturing art.

Another object of this invention is to provide an injection molding manufacturing apparatus and method for in-situ component molding that facilitates the formation of one or more blind holes even though the central core pin of the second component may be cooled with a fluid.

Another object of this invention is to provide an injection molding manufacturing apparatus and method in which a first component is injection molded with a socket containing a blind hole which is then molded in-situ within a second component with the blind hole blocked-off by the central core pin such that the blind hole in the socket of the first component may then be used for receiving a pivot pin or the like.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an injection molding manufacturing apparatus and method that facilitates the formation of a blind hole in a two-component assembly in which the first component is molded in-situ in the second component. More particularly, the injection molding apparatus of the invention includes a molding station having a first cavity and a first central core pin and a first transverse core pin for injection molding a first cylindrically-shaped component having a transverse socket with a blind hole. The station further includes a second mold cavity in which the first component is transferred into the second cavity and the second component is molded in-situ in the first component in such a way that the blind hole is blocked-off by a second central core pin during molding of the second component. In this manner, the two-component in-situ assembly includes a blind hole formed in a socket.

Importantly, inclusion of the socket with the blind hole as an integral portion of the first component which is then molded in-situ within the second component allows the second component to be injection molded through the use of a central core pin that is cooled by means of a fluid. Notably, the socket is not filled-in during injection molding of the second component because it is blocked-off by the core pin of the second component.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
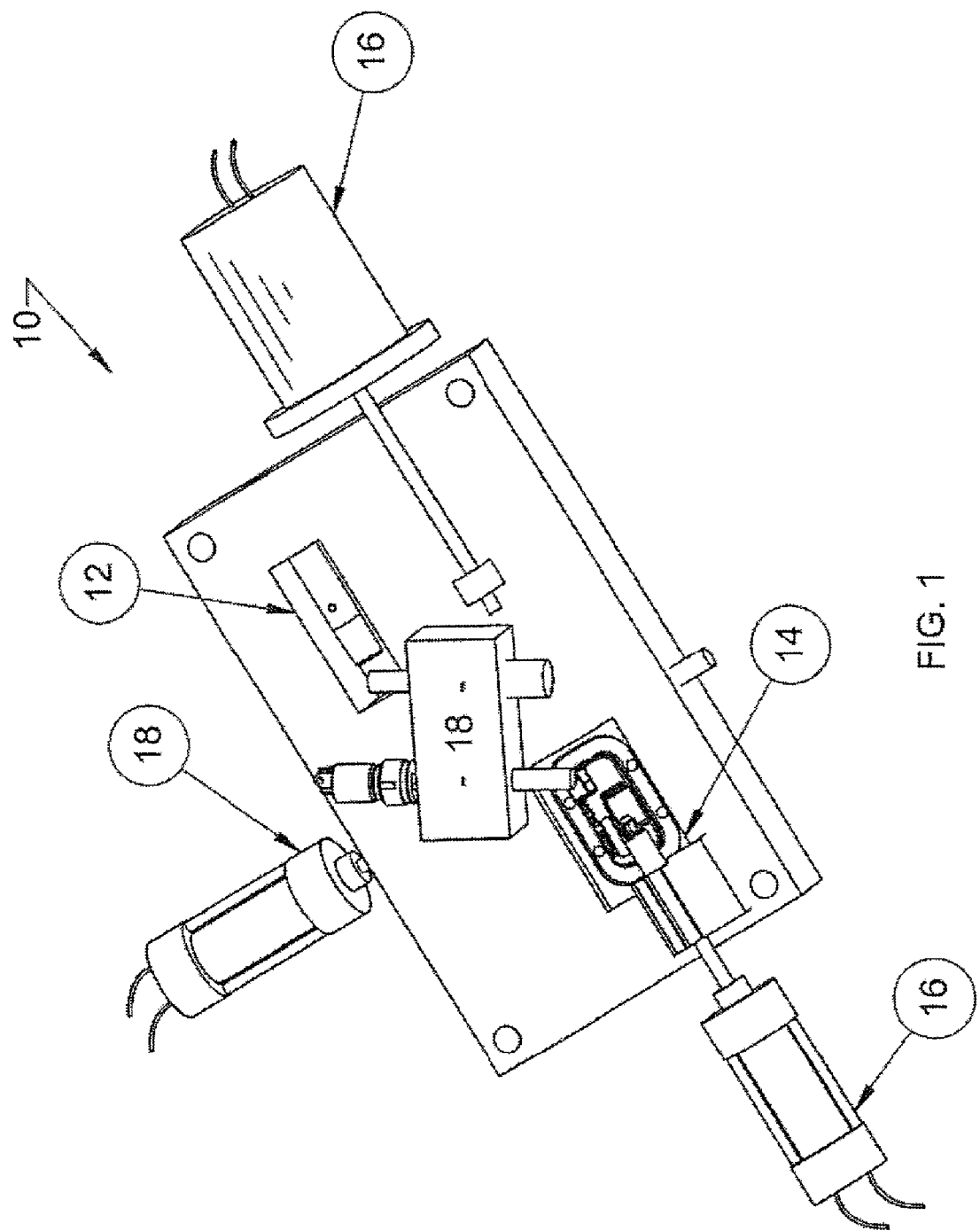
FIG. 1 is a perspective view of the injection molding station.

Referring to FIG. 1, the injection molding manufacturing apparatus and method of the invention is employed through the use of a molding station 10 having a first shot mold 12 and a second shot mold 14 with conventional drive mechanism 16 and transfer mechanism 18. The molding station 10 allows for the injection molding of a "first shot" cylindrical component 20 with a longitudinal bore having a depending skirt 22 with a transverse socket 24 having a blind hole 26 therein.

Figure 2:
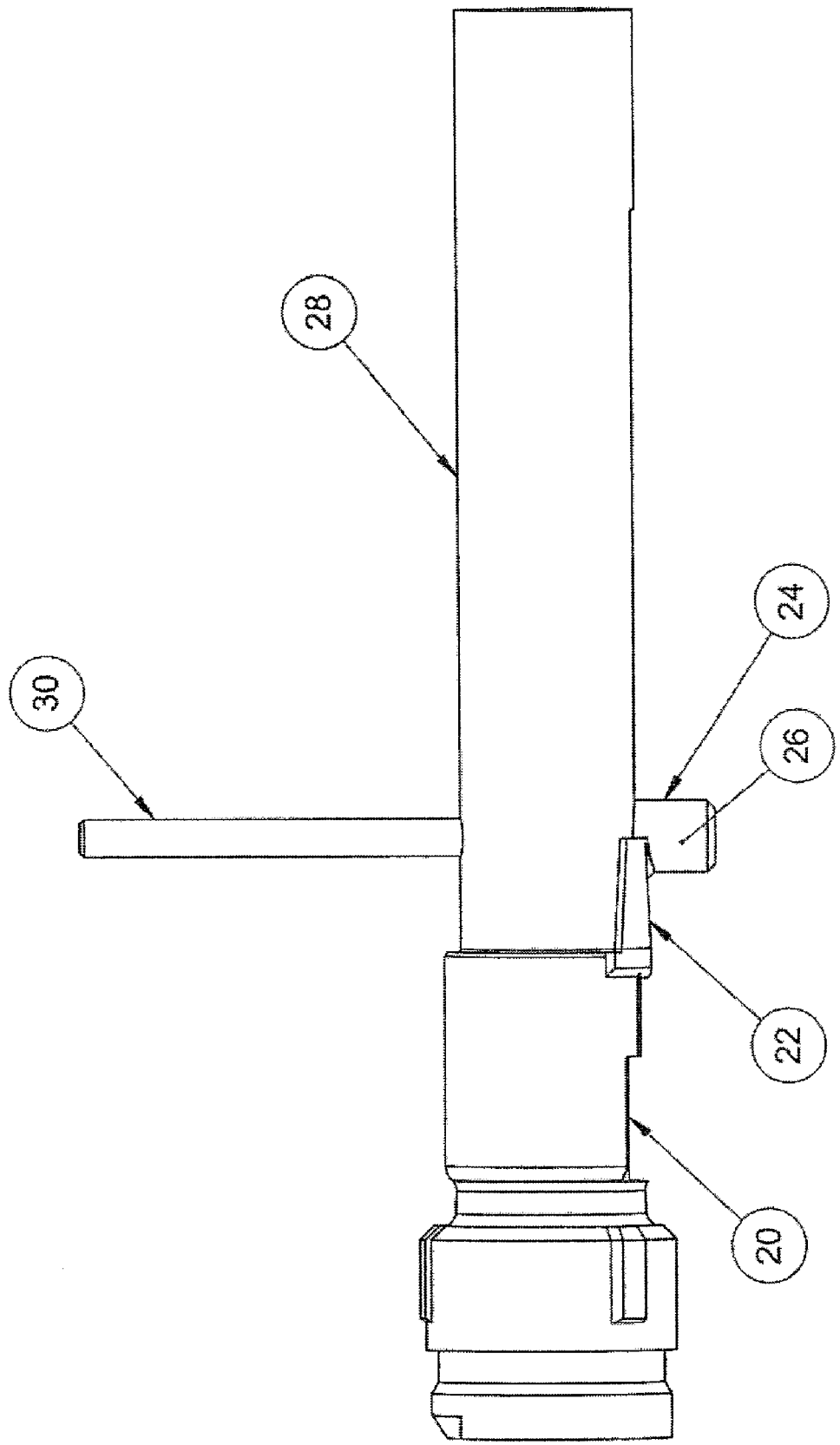
FIG. 2 is a configuration drawing showing the "first-shot" formation of the first component through the use of a central core pin and transverse core pin that defines the central bore and the socket, respectively.

More particularly, the first shot mold 12 comprises an interior configuration that defines the outer configuration of the component 20 to be injection molded. As best shown in FIG. 2, the component's 20 longitudinal bore is defined by a conventional core pin 28 having the desired configuration for the bore. The blind hole 26 is formed within the socket 24 by means of a transverse pin 30 which is inserted through the central core pin 28 after the central core pin 28 is moved into position. The first component 20 may comprise a cylindrical sleeve used during the construction of a heat sealable inflator, such as that described in our concurrently-filed patent application entitled "Heat Sealable Inflator," the disclosure of which is hereby incorporated by reference herein.

Figure 3:
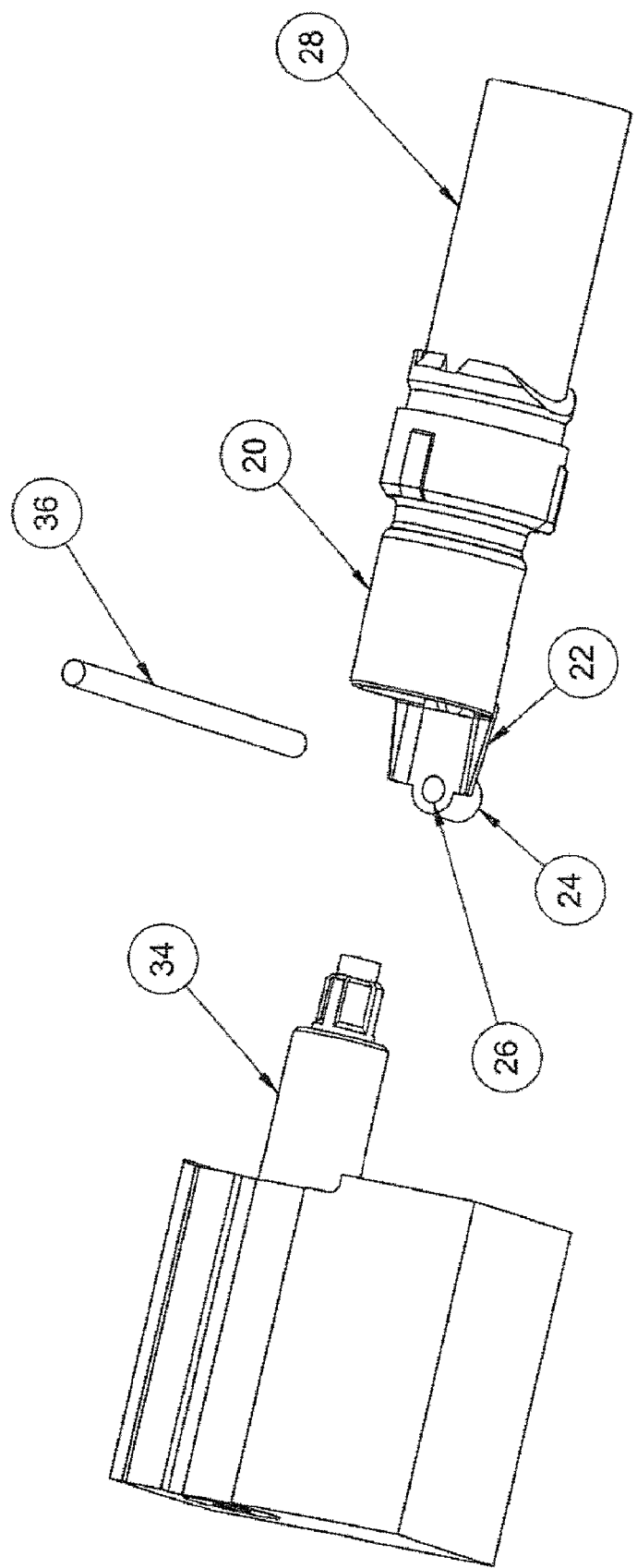
FIG. 3 is an exploded drawing showing the first component being transferred by the core pin to a "second-shot" mold having a fluid-cooled central core pin that seals off the blind hole formed in the socket during the first shot.
Figure 4:
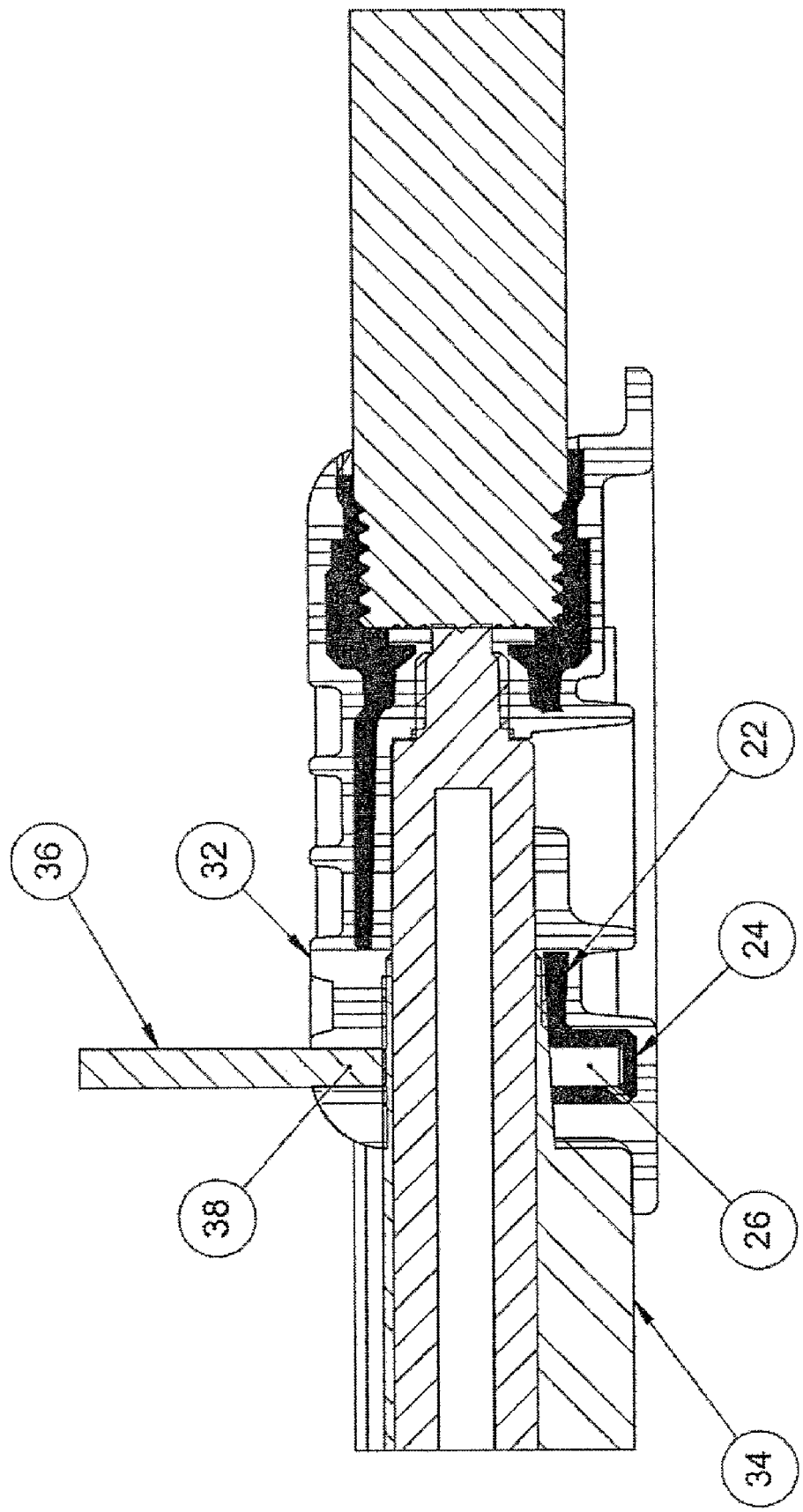
FIG. 4 is a cross-sectional view of the second mold showing the fluid-cooled core pin sealing off the blind hole formed in the socket during the first shot to prevent it from being filled in during the second shot.

Referring now to FIG. 3, after the first component 20 is shot in the first mold 12, it is transferred by means of the transfer mechanism 18 to the second mold 14 by means of the transfer core pin 28. The second shot mold 14 includes an interior configuration that defines the outer configuration of the second component 32 to be produced, such as the inflator more particularly disclosed in our concurrently-filed application (see FIG. 4). Specifically, the second-shot component 32 may include a central passageway defined by a central core pin 34 positioned within the first component 20 by means of the drive mechanism 16. Importantly, the central core pin 34 may comprise a fluid-cooled core pin to maintain the core pin at a predetermined temperature to minimize expansion or contraction thereof that would otherwise alter the manufacturing tolerances during the second-shot molding operation. As best shown in FIG. 4, the core pin 34 includes an outer configuration that moves into adjacent contact with the upper edge of the blind hole 26 formed in the socket 24 of the skirt 22 of the first component 20 such that the blind hole 26 is blocked-off to prevent any injection material from flowing therein during the second shot. It is noted that a transverse core pin 36 may be employed to form a through hole 38 through the other side of the second component 32 in alignment with the blind hole 26 of the socket 24.

It should be appreciated that due to the fluid-cooled core pin 34, the transverse core pin 36 could not extend therethrough to form the blind hole 24 else the cooling fluid would leak from the core pin 34. It should therefore be appreciated that the use of the socket 24 with its blind hole 26 achieves an important advantage over prior art molding processes since it allows the formation of a central bore with extremely high tolerances.

Finally, it should be appreciated that while the molding station 10 discussed above contemplates two-shot molding steps, the first component 20 may be manually transferred from the first shot mold 12 to a second shot mold 14 without the use of the transfer mechanism 18.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for injection molding a two-component in-situ assembly having a blind hole formed in a socket, comprising the steps of:

injection molding a first component having a transverse socket with a blind hole; and injection molding a second component in-situ in the first component with the blind hole blocked-off during molding of the second component to produce the two-component in-situ assembly having a blind hole formed in a socket.

2. The method as set forth in claim 1, wherein the steps of injection molding occurs in a molding station having a first shot mold in which the first component is injection molded and a second shot mold in which the second component is molded, with a transfer mechanism for transporting the first component into the second shot mold.

3. The method as set forth in claim 1, wherein the first component comprises a generally cylindrical component with a longitudinal bore having a depending skirt with the socket positioned transversely, the socket including the blind hole therein.

4. The method as set forth in claim 3, wherein the blind hole is formed within the socket by a transverse core pin which is inserted through a first central core pin after the first central core pin is moved into position.

5. The method as set forth in claim 4, wherein the second component includes a central passageway defined by a second central core pin positioned within the first component.

6. The method as set forth in claim 5, wherein the second central core pin comprises a fluid-cooled core to maintain a predetermined temperature.

7. The method as set forth in claim 5, wherein the second core pin includes an outer configuration that moves into adjacent contact with an upper edge of the blind hole formed in the socket of the first component such that the blind hole is blocked-off during the second shot.

* * * * *